July 21, 1964        C. PETRIDES        3,142,012
BATTERY POWERED SYNCHRONOUS MOTOR
Filed July 30, 1962        2 Sheets-Sheet 1
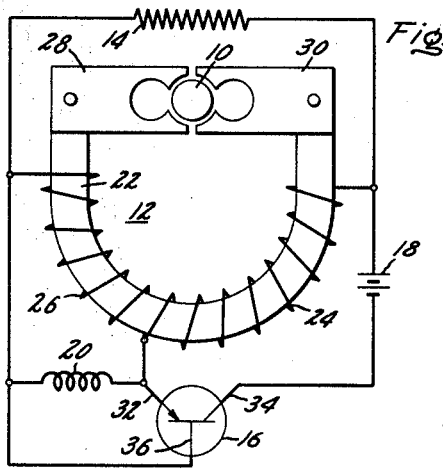
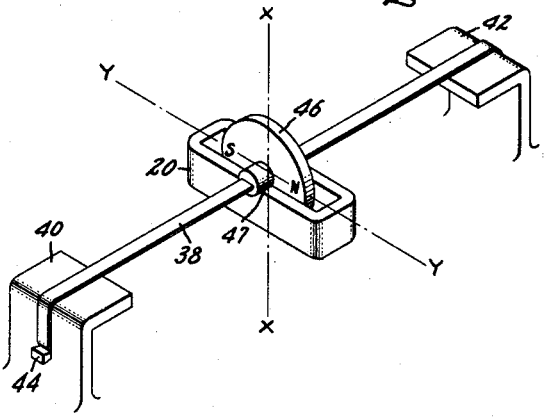
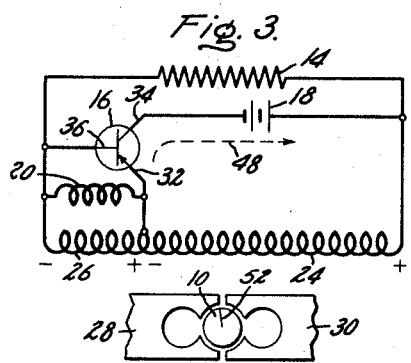
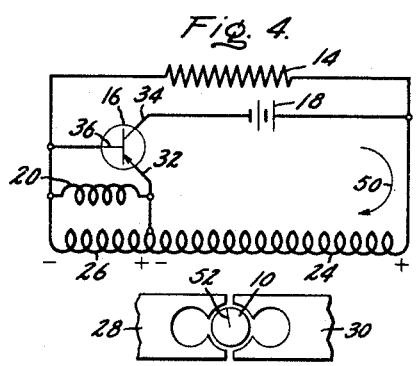
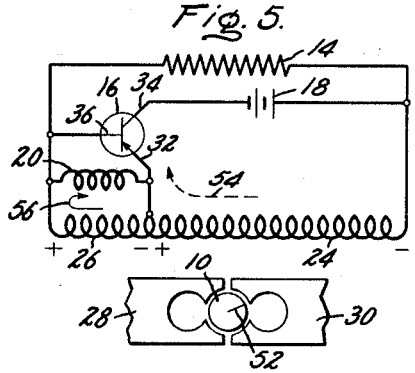
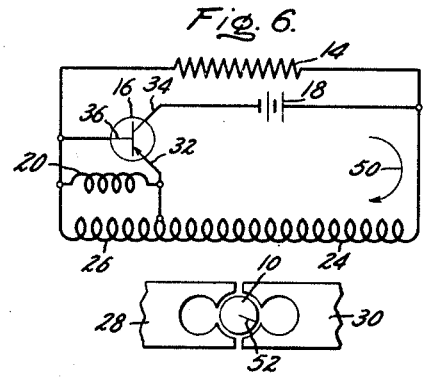
Inventor:
Christie Petrides,
by Leonard J. Platt
His Attorney.

July 21, 1964          C. PETRIDES          3,142,012
BATTERY POWERED SYNCHRONOUS MOTOR
Filed July 30, 1962          2 Sheets-Sheet 2
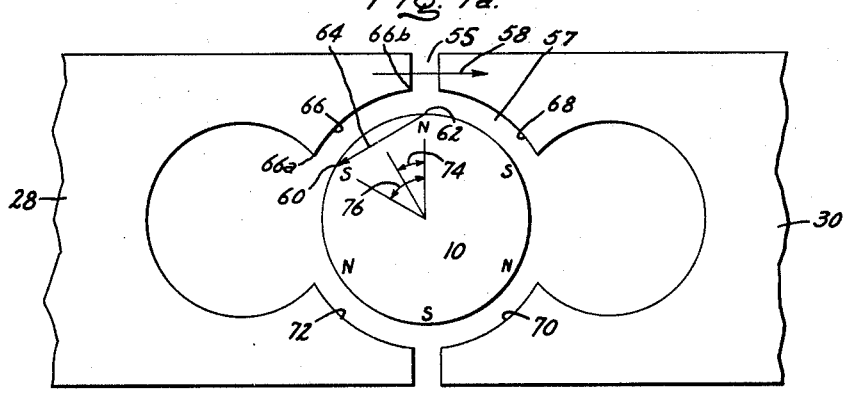
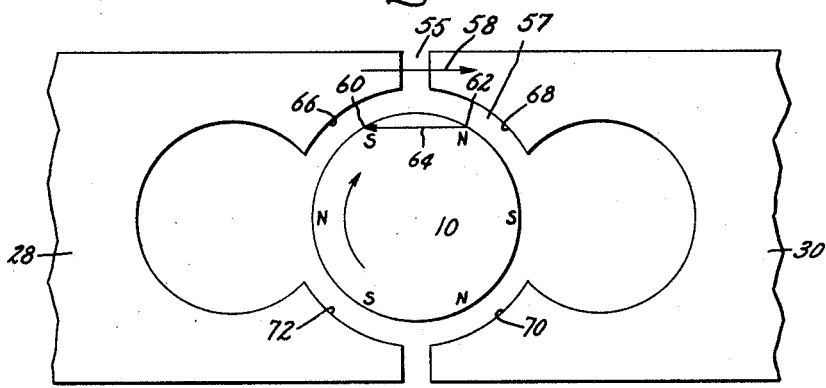
Inventor:
Christie Petrides,
by Leonard Platt
His Attorney.

United States Patent Office 3,142,012
Patented July 21, 1964

3,142,012
BATTERY POWERED SYNCHRONOUS MOTOR
Christie Petrides, Medway, Mass., assignor to General
Electric Company, a corporation of New York
Filed July 30, 1962, Ser. No. 213,342
8 Claims. (Cl. 318—138)

This invention relates to a synchronous motor suitable for driving a clock mechanism and which may be operated by a battery or other direct current source of power. More specifically, it relates to a permanent magnet motor having a direct current source and a rate of rotation synchronized with the oscillations of a mechanical resonant system.

A synchronous motor connected to a conventional alternating current power outlet provides an accurately timed predetermined shaft output which may be conveniently used for driving clock or timer mechanisms. However, clocks driven by batteries or other direct current sources usually require a motor for winding a spring and a spring driven escapement mechanism having a relatively great number of parts for rotating the clock mechanism at the predetermined desired speed. A relatively simple and compact device which may utilize battery power for driving a clock mechanism at a controlled rate is especially desirable.

Accordingly, it is a primary object of the invention to provide an improved rotatable motor which is arranged to be synchronized and driven at a horological rate by a unique D.-C. powered oscillator.

It is a further object of the invention to provide a battery operated synchronous motor which is rotated at a speed timed in response to a permanent magnet positioned on a mechanical oscillator.

Briefly stated, the invention relates to a rotatable synchronous motor and oscillating power supply therefor drawn from a direct current source comprising a permanent magnet rotor, stator means positioned in flux inducing relation with the rotor, and a continuous winding wound on the stator having a main coil portion and a minor coil portion. An electrical translating means such as a transistor is provided having its output serially connected to the main coil portion and having its input serially connected to the minor coil portion. A pickup coil is connected to the input of the electrical translating means to shunt the minor coil portion of the stator winding. Magnet means mounted on a mechanical oscillator is positioned in flux inducing relation with the pickup coil. When the circuit including the main coil portion of the stator winding and the transistor output is connected to a battery, the permanent magnet rotor is rotated at a speed determined by the oscillation of the mechanical oscillating means to thus provide an accurately timed output.

Further features, objects and advantages will become apparent with reference to the following drawings, in which:

FIG. 1 is a schematic diagram of the rotatable synchronous motor of the invention with its associated circuitry;

FIG. 2 is a perspective view of one form of mechanical oscillator mechanism which may be synchronized with the system shown in FIG. 1 to determine the frequency of operation;

FIGS. 3–6 are schematic views of the synchronous motor of the invention shown in various stages of operation;

FIGS. 7a and 7b are detailed schematic views showing the interaction of the rotor and stator magnetic fields of the motor of the invention.

Referring to the drawings, a preferred embodiment of the synchronous motor of the invention may be seen in FIG. 1 as comprising a rotor 10, a field and coil assembly generally indicated at 12, a resistor 14, a transistor 16, and a direct current source of power such as battery 18. The circuit also includes a pickup coil 20, which electrically links an electro-mechanical oscillator of the type shown in FIG. 2 to the circuit.

The rotor 10 may be made of permanent magnetic material and formed with six alternate poles around its periphery as seen in FIGS. 7a and 7b. The rotor 10 may be rotatably supported by bearings (not shown) and further provided with a pinion or other suitable torque transmitting arrangement to drive the mechanism desired such as a conventional gear train of a clock or other timer mechanism (not shown).

The stator field and coil assembly 12 includes a U-shaped field member, preferably formed of silicon steel laminations, and a continuous field coil winding tapped at a point intermediate the ends thereof to form a main coil portion 24 and a minor coil portion 26. The ends of the U-shaped portion 22 have secured thereto pole pieces 28 and 30 made of suitable materials such as silicon steel and shaped and positioned relative to one another and to rotor 10 in a manner to facilitate self-starting of the rotor.

Main field coil 24 is shown serially connected to the output of transistor 16, or more specifically, it is connected to emitter 32 and collector 34. Battery 18 is also serially connected in the transistor output circuit. The minor field coil 26 is serially connected with the transistor input across emitter 32 and base 36. Pickup coil 20 is connected to the input of transistor 16 to shunt minor field coil 26.

The motor circuit shown in FIG. 1 will operate to drive rotor 10, as will be hereinafter described; however, the speed of the rotor is dependent on the various physical characteristics of the various components. Consequently, it is desirable to provide a mechanism which determines the frequency of operation of the motor circuit of FIG. 1 and hence the speed of rotor 10. An example of such mechanism is the torsional oscillator shown in FIG. 2 associated with pickup coil 20. The mechanism shown in FIG. 2 comprises a flat torsion wire 38 secured to fixed supports 40 and 42 by suitable fastening means such as wedge pins, one of which may be seen at 44. As disc shaped permanent magnet 46 is mounted on a non-magnetic arbor 47, which is supported on wire 38. Magnet 46 is positioned in flux inducing relation within pickup coil 20. The magnet 46 may be provided with a north and a south pole diametrically positioned on the disc as indicated by the line Y—Y in FIG. 2. It should be noted that the line Y—Y is perpendicular to the axis of pickup coil 20 as indicated by the line X—X so that when the coil is energized, the magnet 46 will tend to rotate causing the element 38 to twist.

*Theory of Operation*

When a direct current voltage from battery 18 is first applied to the circuit as shown in FIG. 3, a transistor leakage current indicated by dotted arrow 48 tends to flow through the main field coil 24 from emitter 32 to collector 34 of transistor 16. A counter electromotive force is set up in the main field coil 24 to oppose the leakage current flow. The changing flux is the field causes a voltage to be induced across the minor field coil 26 making base 36 of transistor 16 more negative than emitter 32, as indicated by FIG. 3. At this time, both the current path through emitter 32 and collector 34 and the path through emitter 32 and base 36 are forward biased, thereby causing the transistor 16 to conduct. If the magnitude of this base voltage is not large enough to cause transistor 16 to conduct, other signals may turn the transistor "ON," such as, a voltage from the pickup coil 20 generated by the magnet 46 when agitated or a voltage from the minor field coil 26 generated by the rotor 10 when agitated. When the transistor 16 is turned "ON," a large current is free to flow from the battery 18 through the main field coil 24, as indicated by the solid arrow 50 in FIG. 4.

When this larger current tends to flow through the main field coil 24, a larger change of field flux induces a larger voltage across the minor field coil 26 and thus across emitter 32–base 36 to thereby hold the transistor 16 in a conducting state as indicated in FIG. 4. At this point, most of the current from the minor field coil 26 flows through the transistor 16 and not the pickup coil 20 since the input resistance of the conducting transistor 16 is much less than that of pickup coil 20. The larger conducting current when flowing through the main field coil 24 produces magnetic flux which flows in the field member 22 through the pole pieces 28 and 30 and through the air gaps separating the pole pieces. This magnetic flux reacts with the flux of permanent magnet rotor 10 causing the rotor to rotate as will be hereinafter described in more detail with reference to FIGS. 7a and 7b. However, for present purposes of understanding the overall operation of the synchronous motor of the invention the radial line 52 in FIGS. 3 through 6 represents one of the poles of permanent magnet rotor 10 as it is moved during the steps of operation. In FIGS. 3 and 4 the rotor 10 is shown in one static reluctance position as indicated by the radial line 52; and as mentioned above, the flux flowing through the stator pole pieces 28 and 30 caused by the large current generated when the transistor was turned on will rotate the rotor 10 to a new position as indicated by the radial line 52 in FIG. 5.

After the transistor 16 is "ON," the current in the main field coil 24 reaches a steady state condition or constant value; and as a result, there is no change in field flux to produce a voltage across the minor coil 26. However, as the rotor 10 changes its position thereby changing its flux through the stator field members, there is a voltage generated across the minor field coil 26, as indicated in FIG. 5. When this voltage across minor field coil 26 makes base 36 positive with respect to emitter 32, the transistor 16 is turned "OFF". In the transistor "OFF" state, the large current which is flowing in the main field coil 24 is suddenly interrupted.

This sudden interruption of current causes a changing magnetic flux in stator field members which produces a voltage across the main and minor field coils opposing any change of main field current as shown in FIG. 5. The induced voltage across the minor field coil 26 which makes base 36 positive with respect to emitter 32 holding the transistor in the "OFF" state, cannot cause current to flow through the transistor 16 since the transistor offers a great resistance to current flowing in this direction. Thus, only a leakage current may flow, as indicated by the dotted arrow 54 in FIG. 5. Therefore, the minor field coil induced voltage can only cause current indicated by arrow 56 in FIG. 5, to flow through the pickup coil 20 producing a magnetic field along the X—X axis of the coil shown by FIG. 2.

Since the X—X axis is perpendicular to the Y—Y magnetic axis of magnet 46, the magnet field pulse reacts with the magnetic field of magnet 46, causing the magnet to be angularly displaced. After the magnetic field pulse disappears the restoring force of the flat wire 38 rotates magnet 46 in the opposite direction. From this point on, once every cycle when transistor 16 is turned "OFF," the torsional oscillator of FIG. 2 receives energy in the form of a pulse from the minor field coil 26 which sustains its oscillations. Since the magnet 46 oscillates in the air core of pickup coil 20, voltage signals will be generated in the pickup coil at the natural frequency of the torsional "ON" and "OFF" thereby controlling the frequency of the synchronous motor. In effect, the torsional oscillator of FIG. 2 alternately acts as a motor and then a generator. Thus, it will be appreciated that the rotor 10 will rotate at a speed determined by the oscillating frequency of the torsional oscillator and by the number of magnetic poles in permanent magnet rotor.

A better understanding of the operation of the synchronous motor may be obtained by reference to FIGS. 7a and 7b. Whenever the transistor 16 is turned "ON" (FIG. 4), current flows through the main field coil 24 causing stator magnetic flux to flow in air gaps 55 and 57. The stator magnetic flux flows from a higher to a lower magnetic potential as arbitrarily indicated by arrow 58. As stated previously, rotor 10 may be provided with six alternate magnetic poles spaced around its periphery which are indicated as S for south or N for north in FIG. 7, one north pole and one south pole having been further identified as 62 and 60 respectively. The rotor magnetic field direction has been arbitrarily chosen as being in the direction shown by arrow 64 in FIG. 7. The stator pole pieces 28 and 30 have been provided with four arcuate pole pieces 66, 68, 70 and 72 spaced around the periphery of rotor 10. The rotor 10 in seeking its minimum flux reluctance position rotates its magnetic poles across from the tips of the pole arcs, that is, south pole 60 is shown positioned across from edge or tip 66a of stator pole 66 and north pole 62 is shown positioned across from tip 66b of stator pole 66, as seen in FIG. 7a.

Under dynamic operation, when stator flux flows, a magnetic field having a direction indicated by arrow 58 appears in air gaps 55 and 57. Whenever stator flux appears, arrow 64 which represents rotor flux between poles 60 and 62 tends to become parallel to arrow 58 (FIG. 7b), thereby producing a torque on rotor 10. The produced torque is a maximum when the angle 74 between arrow 58 and 64 is equal to one half the angle 76 between rotor pole 60 and 62. This is accomplished by making the arc circumscribed by stator pole 66, the same as angle 76 between adjacent rotor poles. For good rotor starting characteristics produced torque must be greater than the rotor reluctance torque which tends to hold the rotor in its minimum reluctance position. The produced torque forces rotor 10 to rotate overcoming the rotor reluctance torque. As rotor 10 rotates past its maximum reluctance position, the rotor generative signal in the minor field coil 26 turns transistor 16 "OFF" and the produced rotor torque disappears.

Rotor 10 continues to rotate because of the rotational energy stored in its inertia plus the reluctance torque energy it receives from being forced toward the next minimum reluctance position. Rotor 10 overshoots the next minimum reluctance position because of its inertia, and the signal it generates in the minor field coil turns the transistor "ON." By this time rotor 10 has reached a position two pole pitches away from the starting point as indicated by line 52 in FIG. 6 and is ready to receive energy from the next stator magnetic pulse. The next cycle starts and rotor 10 continues to rotate being pulsed by the stator flux once very cycle when the transistor conducts. The rotor inertia and magnetic lines of flux to the adjacent stator poles act like a torsion spring applying a restoring torque to rotor 10 whenever it is angularly displaced from its minimum reluctance position. In effect this inertia and magnetic spring constitutes an oscillatory system so that the rotor may be considered to be magnetically oscillating, although it physically rotates in one direction. In other words, the stator poles only sense a sinusoidal torque as rotor 10 rotates by them. This oscillatory system is forced into oscillation (or rotation) by the stator magnetic flux which is present only a portion of a complete cycle, the system in effect forming a motor oscillator.

The total period of one complete cycle of the motor oscillator is the sum of the stator flux period and the rotor natural period. The motor oscillator frequency is then the inverse of this total period and is made to be near the natural frequency of the torsional oscillator of FIG. 2. The torsional oscillator is then excited by energy of the correct frequency, and its generated signal in pickup coil 20 controls the frequency of the motor oscillator inasmuch as the torsional oscillator has a higher "Q," or sharpness of resonance. By making the highest exciting frequency of the motor oscillator slightly lower than the natural frequency of the torsional oscillator, greater control frequency stability with varying voltage is obtained. The system is designed such that there is a small change in control frequency over the whole operating voltage range.

To summarize, rotor 10 is started by a stator magnetic field pulse when transistor 16 is made to conduct. Rotor 10 rotates generating signals in the stator minor field coil 26 which turn the transistor 16 "ON" and "OFF" until the torsional oscillator signals in pickup coil 20 take over. From this point on, the torsional oscillator controls the frequency of the system turning the transistor 16 "ON" and "OFF." Each time the transistor is turned "ON" rotor 10 receives energy from the stator magnetic field pulse which sustains its rotation; and whenever the transistor is turned "OFF," the torsional oscillator receives energy from pickup coil 20 to sustain its oscillations. Therefore, the whole system is self-sustaining and oscillates at a frequency governed by the basic timing element, the torsional oscillator.

It should be understood that the particular system described is merely an example of the invention, and it will be obvious to those skilled in the art that various changes and modifications may be made without departing from the invention in its broader aspects. Accordingly, it is intended in the appended claims to cover all such changes and modifications which fall within the true spirit and scope of the invention.

What I claim is:

1. A rotatable synchronous motor and oscillating power supply therefor comprising a permanent magnet rotor, stator means positioned in flux inducing relation with the rotor, a continuous winding wound on the stator having a main coil portion and a minor coil portion, a source of electrical energy, electrical translating means having its output serially connected to said source and the main coil portion and having its input serially connected to the minor coil portion, a pickup coil connected to the input of said electrical translating means to shunt said minor coil portion, and a mechanical oscillator having a natural frequency of oscillation positioned in flux inducing relation with said pickup coil, said mechanical oscillator being arranged to supply a signal to said electrical translating means to synchronize said motor in accordance with the frequency of said mechanical oscillator.

2. A rotatable synchronous motor and oscillating power supply therefor comprising a permanent magnet rotor, stator means positioned in flux inducing relation with the rotor, a continuous winding wound on the stator having a main coil portion and a minor coil portion, electrical translating means having its output serially connected to the main coil portion and having its input serially connected to the minor coil portion, a pickup coil connected to the input of said electrical translating means to shunt said minor coil portion of said stator winding, mechanical oscillating means having a natural frequency of oscillation, and permanent magnetic means mounted on said mechanical oscillating means and positioned in flux inducing relation with said pickup coil.

3. A rotatable synchronous motor and oscillating power supply therefor comprising a permanent magnet rotor, stator means positioned in flux inducing relation with the rotor, a continuous winding wound on the stator having a main coil portion and a minor coil portion, electrical translating means having its output serially connected to the main coil portion and having its input serially connected to the minor coil portion, a pickup coil connected to the input of said electrical translating means to shunt said minor coil portion of said stator winding, a torsion wire supported for torsional oscillation, permanent magnetic means mounted to oscillate with said wire and positioned in flux inducing relation with said pickup coil.

4. A rotatable synchronous motor and oscillating power supply therefor comprising, a rotor having a permanent magnet portion including a plurality of alternate poles spaced around its periphery, stator means having a U-shaped field portion including pole members attached to the respective ends of the U-shaped portion and adapted to be positioned in flux inducing relation with the rotor, a continuous winding wound on the U-shaped portion of the stator having a main coil portion and a minor coil portion, electrical translating means having its output serially connected to the main coil portion and having its input serially connected to the minor coil portion, a pickup coil connected to the input of the electrical translating means to shunt said minor coil portion of said stator winding, and a mechanically oscillating magnetic balance wheel having a natural frequency of oscillation positioned in flux inducing relation with said pickup coil.

5. A rotatable synchronous motor and oscillating power supply therefor comprising a permanent magnet rotor, stator means positioned in flux inducing relation with the rotor, a continuous winding wound on the stator having a main coil portion and a minor coil portion, electrical translating means having its output serially connected to the main coil portion and having its input serially connected to the minor coil portion, an air core pickup coil connected to the input of said translating means to shunt said minor coil portion of said stator winding, a torsion element supported for torsional oscillation, and a permanent magnet balance wheel mounted on said element and positioned with the air core of said pickup coil, said magnet having a pair of opposed poles diametrically spaced on the magnet with the axis of said poles being substantially perpendicular to the axis of said pickup coil when said torsion wire is in an unrestrained position.

6. A self-starting rotatable synchronous motor and oscillating power supply therefor comprising a permanent magnet rotor, stator means positioned in flux inducing relation with the rotor, a continuous winding wound on the stator and having a main coil portion and a minor coil portion, a transistor having its output serially connected to the main coil portion and having its input serially connected to the minor coil portion, a pickup coil connected to the transistor input to shunt said minor coil portion, magnetic means positioned in flux inducing relation with said pickup coil, and mechanical oscillator means having a natural frequency of oscillation fixed to said magnetic means.

7. Apparatus for driving a clock mechanism at a predetermined rate of rotation comprising a permanent magnet motor rotor, a stator positioned in inductive relation with the rotor, a continuous winding wound on said stator having a tap intermediate its ends to form a first and a second winding portion, a battery, a transistor having an emitter and a collector serially connected to said first winding portion and said battery, said transistor having a base serially connected to said second winding portion and said emitter, a pickup coil connected in parallel with said second winding portion and a permanent magnet positioned in inductive relation with said pickup coil, said magnet being mounted to be mechanically oscillated.

8. A permanent magnet synchronous motor system comprising a permanent magnet rotor, a stator positioned in inductive relation with the rotor, a stator winding tapped to form a major and a minor coil portion, a source of direct current, a transistor having its output circuit serially connected to the major coil portion and the current source, said transistor having its input circuit serially connected to said minor coil portion, a pickup coil connected in series with said transistor input circuit and in parallel with said minor coil portion, a permanent magnet mounted to mechanically oscillate in inductive relation with said pickup coil, said permanent magnet receiving energy through the pickup coil during one-half of the oscillation cycle and supplying energy to the transistor input during the other half of the cycle.

References Cited in the file of this patent
UNITED STATES PATENTS

| | | |
|---|---|---|
| 2,890,399 | Dyne | June 9, 1959 |
| 2,994,023 | Devol | July 25, 1961 |